E. C. DITTMAR.
APPARATUS FOR COATING AND FINISHING FLOORING.
APPLICATION FILED AUG. 28, 1918.

1,339,106.

Patented May 4, 1920.

Inventor
E. C. Dittmar
By
Attorney

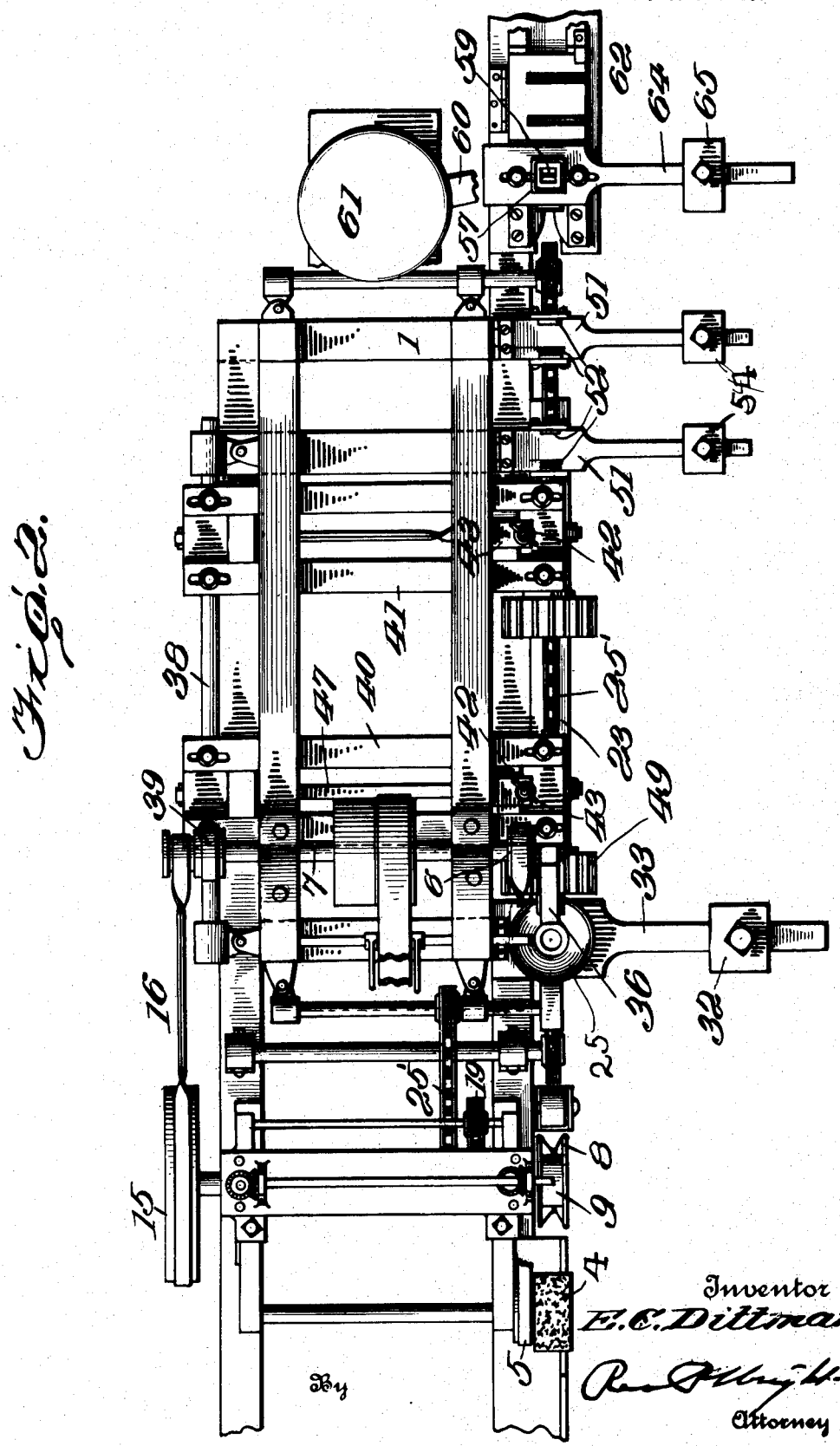

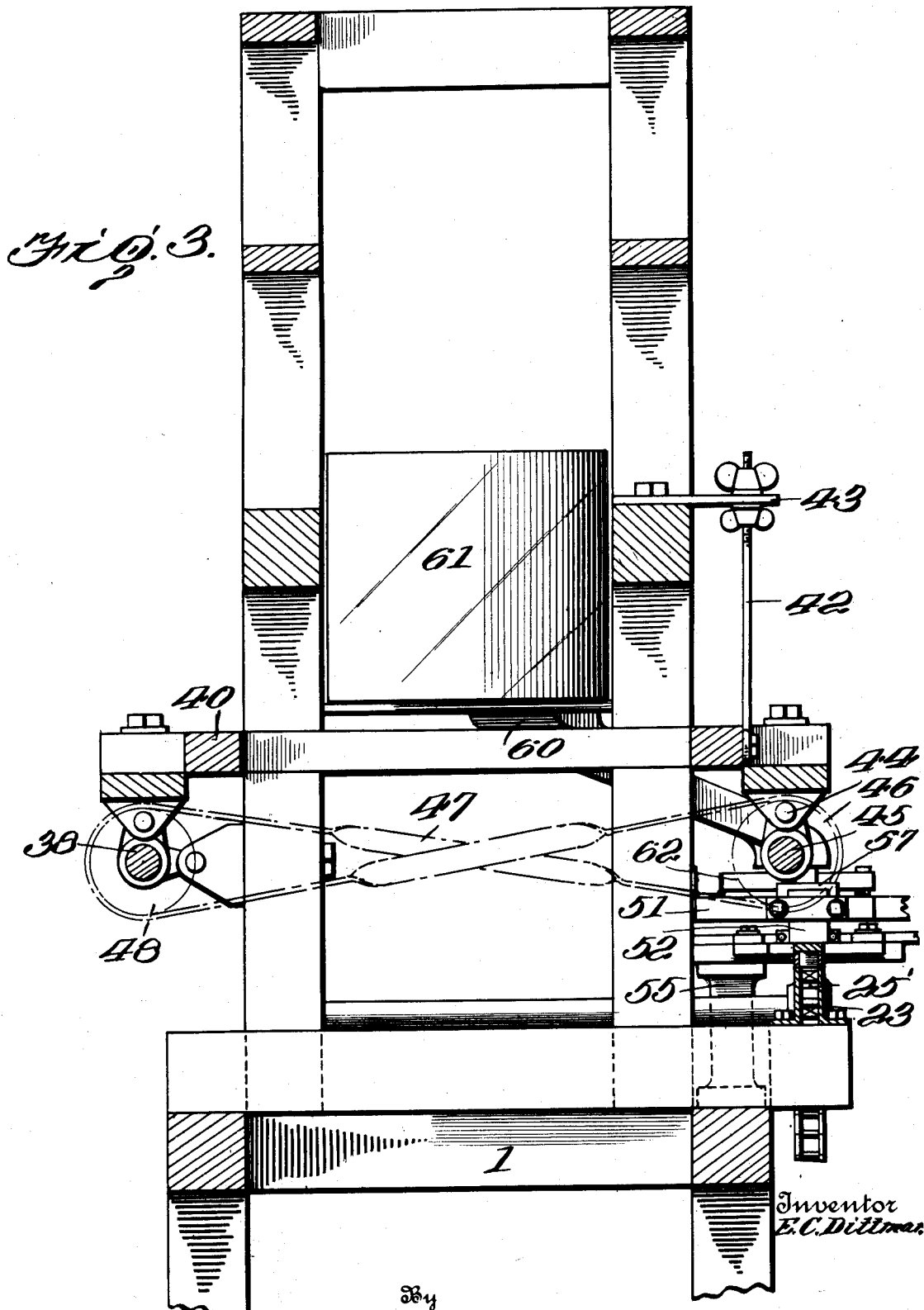

E. C. DITTMAR.
APPARATUS FOR COATING AND FINISHING FLOORING.
APPLICATION FILED AUG. 28, 1918.
1,339,106.
Patented May 4, 1920.
6 SHEETS—SHEET 4.
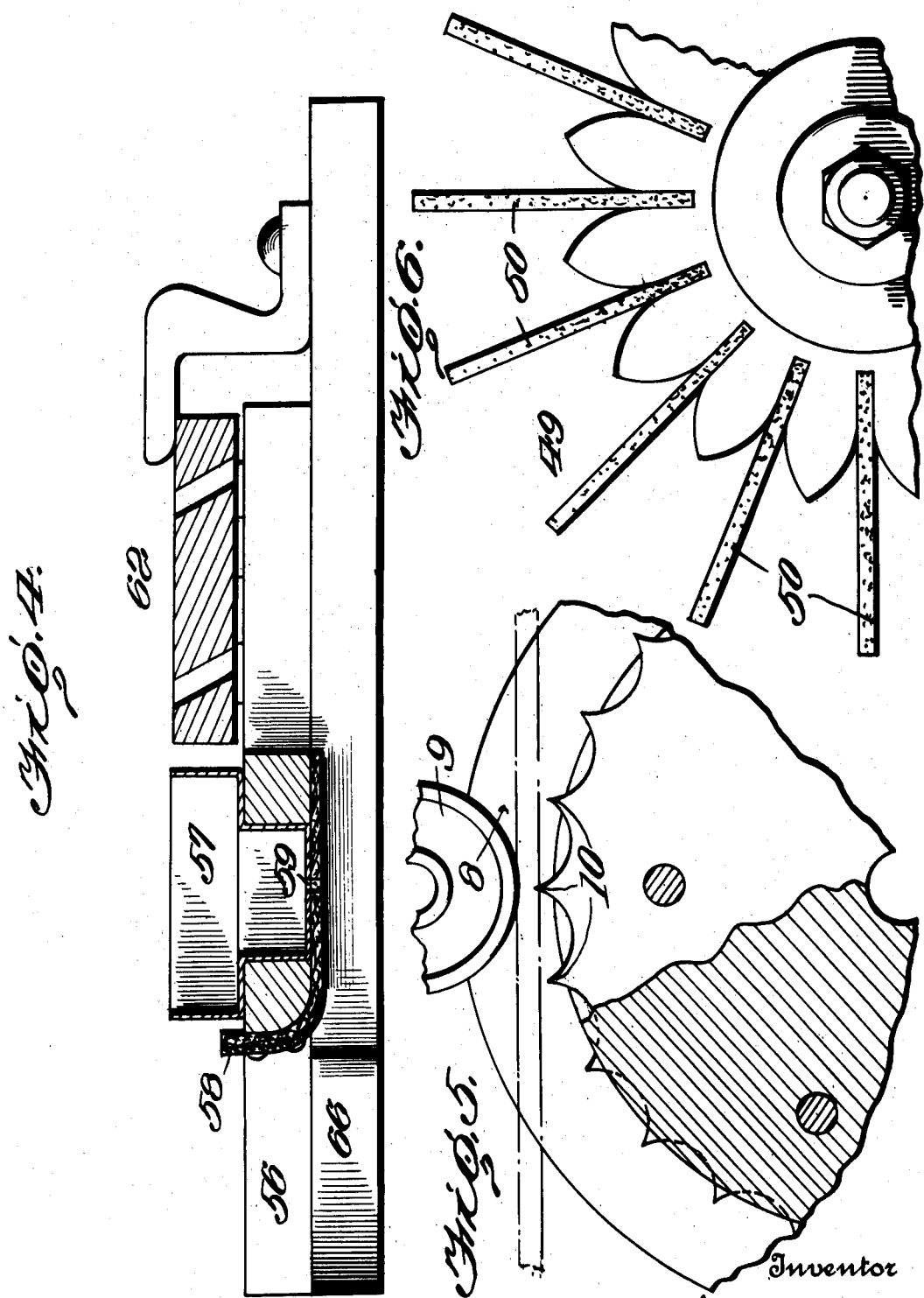

E. C. DITTMAR.
APPARATUS FOR COATING AND FINISHING FLOORING.
APPLICATION FILED AUG. 28, 1918.
1,339,106.
Patented May 4, 1920.
6 SHEETS—SHEET 5.
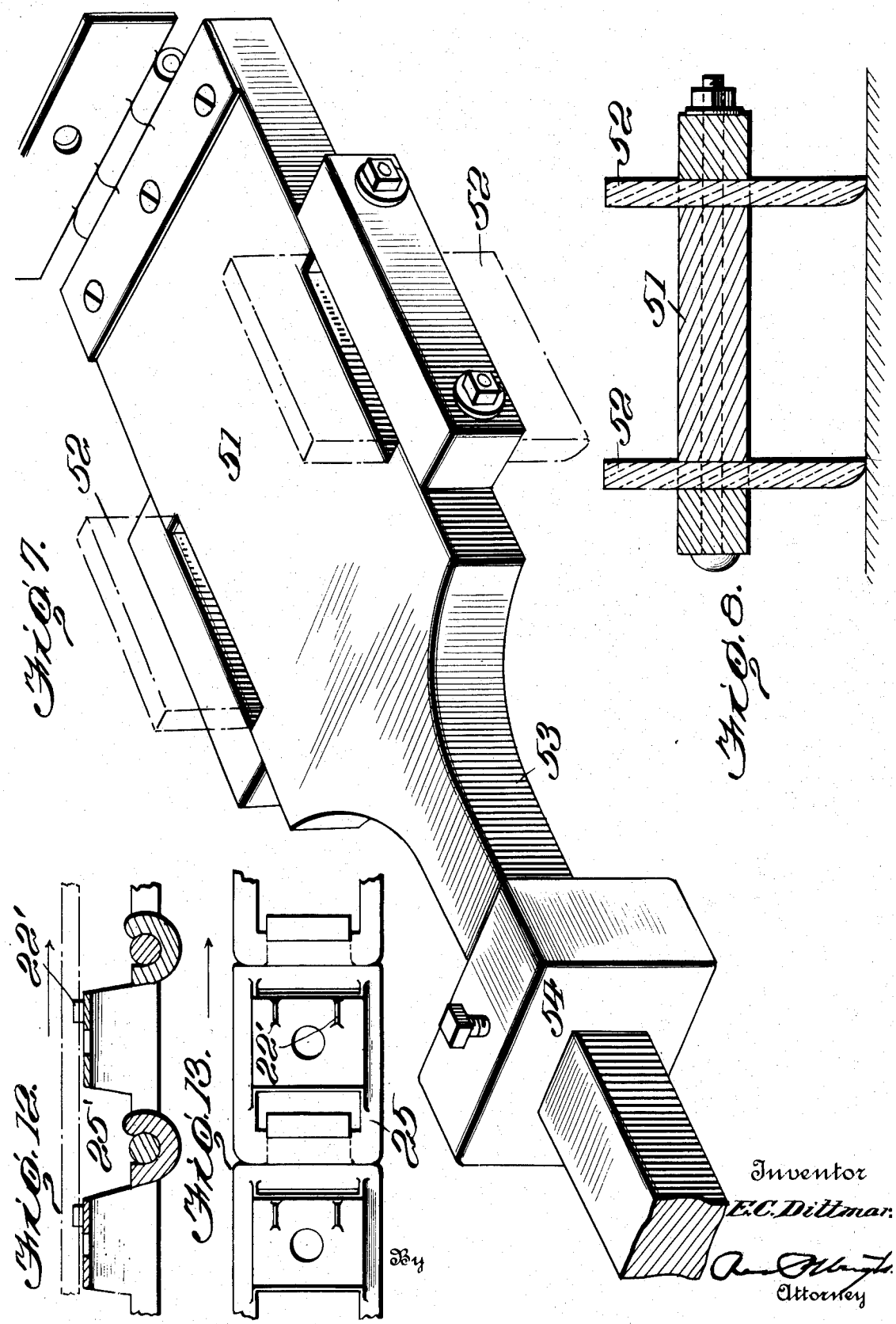

E. C. DITTMAR.
APPARATUS FOR COATING AND FINISHING FLOORING.
APPLICATION FILED AUG. 28, 1918.
1,339,106.
Patented May 4, 1920.
6 SHEETS—SHEET 6.
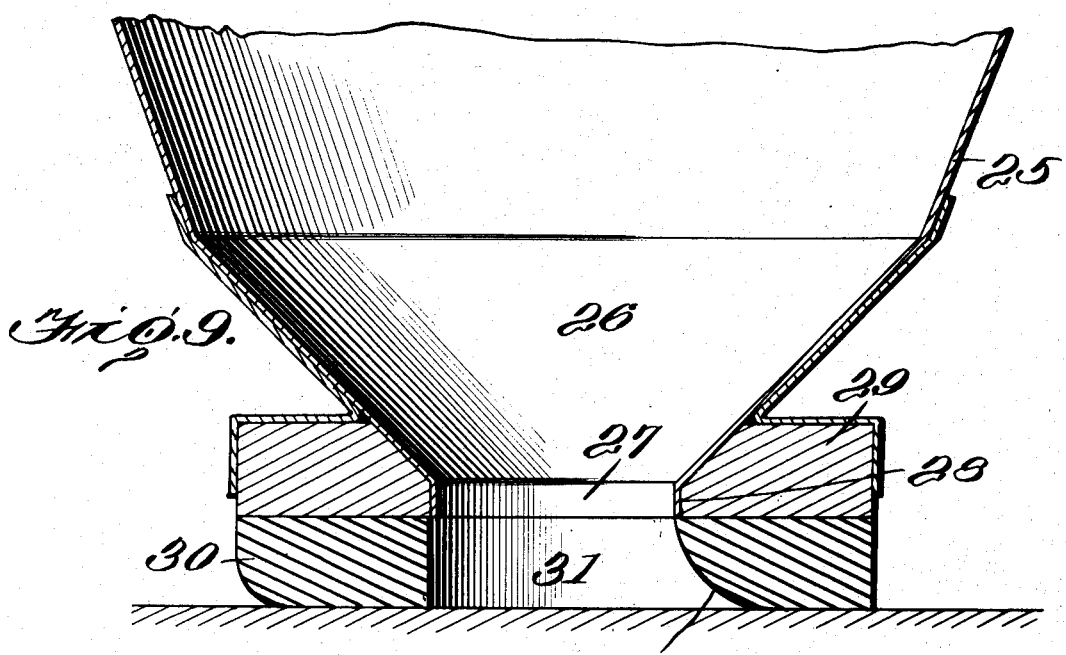
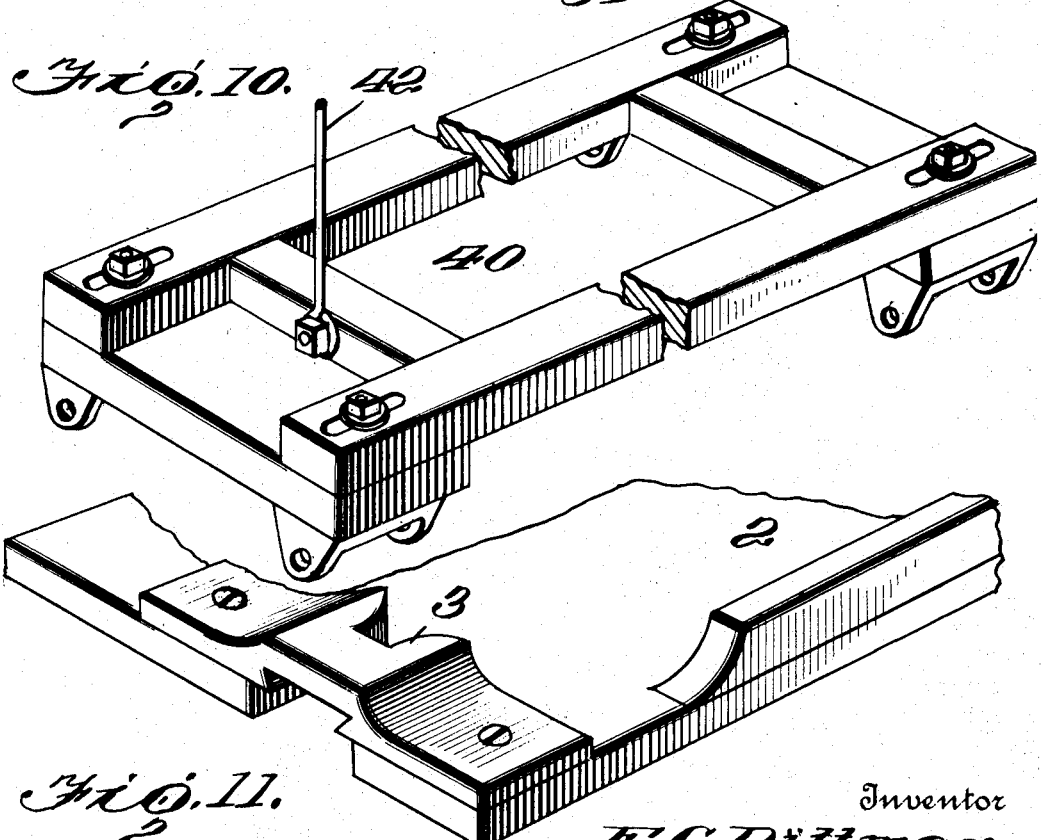
Inventor
E. C. Dittmar;
By
Attorney

UNITED STATES PATENT OFFICE.

ELMER C. DITTMAR, OF WILLIAMSPORT, PENNSYLVANIA.

APPARATUS FOR COATING AND FINISHING FLOORING.

1,339,106.  Specification of Letters Patent.  Patented May 4, 1920.

Application filed August 28, 1918. Serial No. 251,739.

*To all whom it may concern:*

Be it known that I, ELMER C. DITTMAR, a citizen of the United States, residing at Williamsport, in the county of Lycoming and State of Pennsylvania, have invented certain new and useful Improvements in Apparatus for Coating and Finishing Flooring, of which the following is a specification, reference being had therein to the accompanying drawing.

This invention relates to certain new and useful improvements in an apparatus for coating and finishing flooring, the object being to provide a machine by means of which the flooring strips can be coated and finished in such a manner that all hand labor is eliminated, thereby saving the expense involved in manufacturing flooring now in use.

Another object of my invention is to provide a machine which is so constructed that the flooring strips in the passage through the same are prevented from moving out from under the trays containing the coating material until the next strip has passed under the same, thereby preventing the coating material from being wasted.

Another object of the invention is to provide a machine in which the filler is first spread on the strip and then wiped so as to force the same into the pores of the wood.

Other and further objects and advantages of the invention will be hereinafter set forth and the novel features thereof defined by the appended claims.

Like numerals of reference refer to like parts in the several figures of the drawings.

In the drawings—

Fig. 2 is a top plan view of the same.

Fig. 3 is a section taken on the line 3—3 of Fig. 1.

Fig. 4 is a longitudinal vertical section through a varnish tray and brush holder.

Fig. 5 is a detail view of the feed roller partly in section.

Fig. 6 is a detail view of one of the wipers.

Fig. 7 is a perspective view of the burnisher holder.

Fig. 8 is a transverse section through the same.

Fig. 9 is a detail vertical enlarged section of the lower portion of the filler tank.

Fig. 10 is a perspective view of the wiper supporting frame.

Fig. 11 is a detail perspective view of the feed table.

Fig. 12 is a section through a portion of the conveyer; and

Fig. 13 is a plan view of the same.

Figure 1:
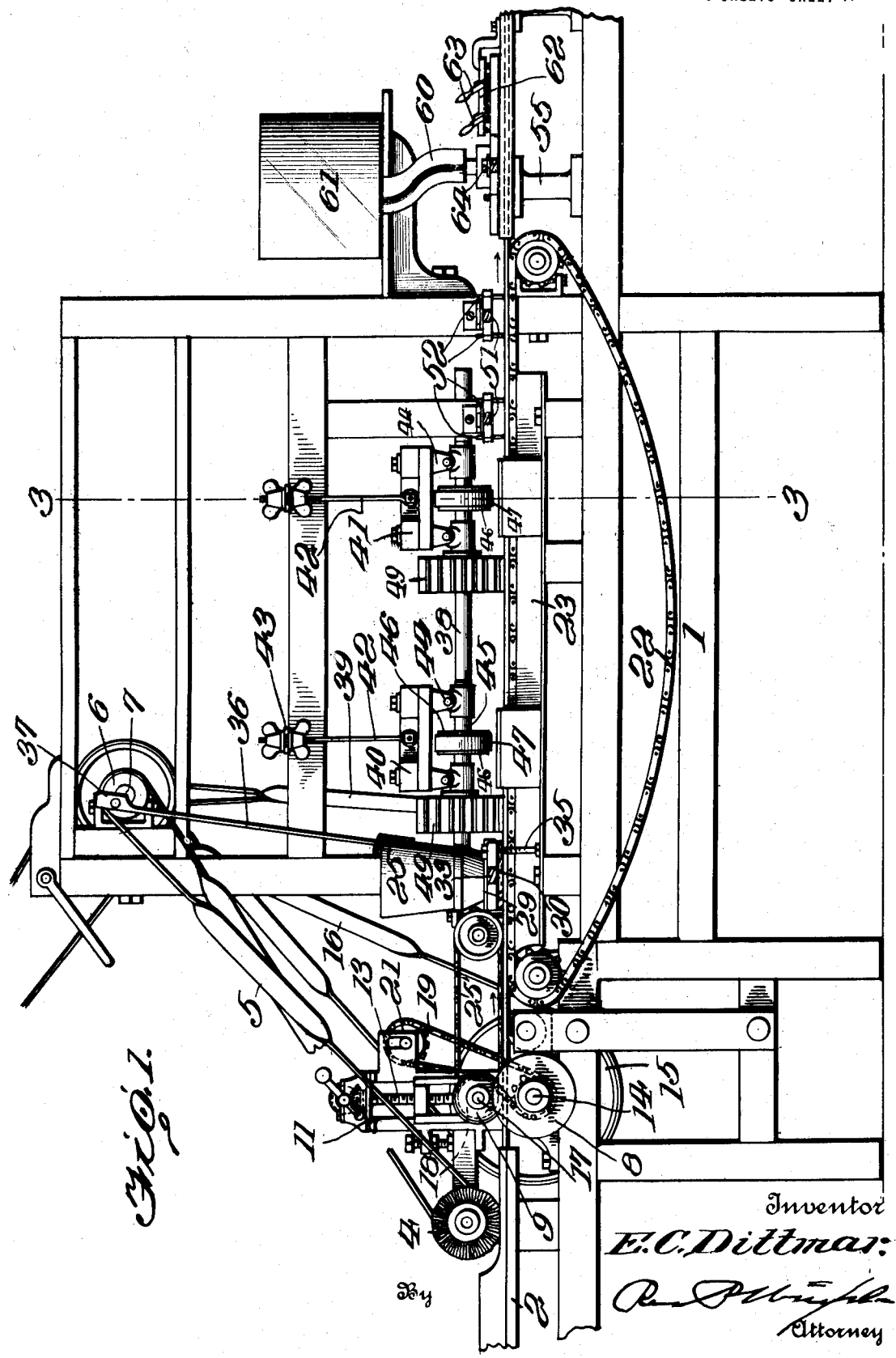
Figure 1 is a side elevation of my improved construction of apparatus for coating and finishing flooring.

In the drawings, 1 indicates the frame of the machine which is provided with a feed table 2 having a guide-way 3 through which the strips of flooring are forced. Arranged over the feed table is a brush 4 for cleaning the pores of the wood as the strips are fed into the machine, said brush being driven by a belt 5 passing over a pulley 6 carried by the power shaft 7 which is driven in any suitable way.

Arranged in alinement with the guide-way 3 are a pair of feed rollers 8 and 9, the roller 8 being grooved and having spurs 10 adapted to engage the underside of the strip of flooring in order to force the same through the machine. The roller 9 engages the upper face of the strip so as to hold the same in engagement with the spurs, and is provided with means 11 for adjusting the pressure, said means being herein shown consisting of a pair of threaded screws 13 which are adjusted so as to engage the bearings of the rollers 9 in order to apply the proper pressure.

The roller 8 is carried by a shaft 14 having a pulley 15 driven by a belt 16 extending from the power shaft 7, as clearly shown in Fig. 2. The roller 9 is carried by shaft 17 which has fixed thereon the sprocket wheel 18 engaged by sprocket chain 19, which in turn is driven by sprocket wheel 20 carried by the shaft 14, said chain passing over an idle sprocket 21, as fully shown in Fig. 1.

Arranged in alinement with the feed rollers 8 and 9 is an endless conveyer 22 which is supported in a horizontal position by angle irons 23 so as to provide a flat bed for the strips of flooring. The endless conveyer 22 is composed of a chain provided with spurs 22′ which are forced into the underside of the strip of flooring by a pressure roller 24, said roller being driven by a chain 25′ from the shaft 17.

Arranged in advance of the pressure roll 24 is a tank 25 adapted to contain the filler in a semi-plastic state. The filler employed is composed of a base formed of ground silax, linseed oil, Japan drier and coloring matter with just a sufficient amount of thinner such as turpentine for a binder to allow the filler to be formed very thick so that when forced into the pores of the wood under pressure any surplus of oil is absorbed by the wood and as the filler is comparatively dry when applied it does not sink or dry in the pores of the wood or combine with the varnish which is applied directly thereon. A tank is provided with a conical lower end 26 terminating in a neck 27 which is seated in an aperture 28 formed in a block 29. Secured to the under face of the block 29 is a strip of rubber 30 provided with an opening 31 registering with the neck 27 into which the filler passes by gravity, and this strip of rubber is adapted to bear against the upper face of the strip of flooring and be held in contact therewith under pressure by a weight 32 adjustably mounted on an extension 33 of the block 29. The opening 31 has a width less than the width of the strip of flooring, and the forward edge is rounded as shown at 34 so as to wipe or cause the filler to be forced into the pores of the wood as the strip passes under the same.

The pressure of the rubber against the strip is regulated by screws 35 carried by the block 29, which limits the downward movement of the same. The filler within the tank 25 is agitated by a rod 36 mounted on an eccentric 37 secured to the power shaft 7 so as to keep the filler thoroughly agitated in order to prevent the same from hardening.

Mounted in suitable bearings in the rear of the frame is a shaft 38, which is driven by a belt 39 extending from the power shaft 7, said shaft being provided with tight and loose pulleys and a belt shifter so that the power can be applied at the will of the operator.

Mounted on a shaft 38 are a pair of frames 40 and 41 supported at their forward ends by rods 42 which are adjustably mounted at their upper ends in brackets 43 carried by the frame for the purpose hereinafter fully described.

The forward ends of the frames 40 and 41 are provided with adjustable bearings 44 in which are mounted shafts 45 carrying pulleys 46, over which pass belts 47, carried by pulleys 48 fixed on the shaft 38, one of the belts being twisted in order to drive one of the shafts 45 in a reverse direction to the other, and these shafts are arranged out of alinement for a purpose hereinafter fully described.

Fixed on the end of each of the shafts 45 is a wiper 49 having radially extending leather strips 50 which are adapted to wipe the filler placed on the strips toward the side edges of the strip of flooring. The filler applied to the strip of flooring by the tank 25 does not extend the full width of the strip, and as these wipers rotate in reverse directions the filler is forced toward the side edges at the same time the strips force the filler into the pores of the wood, so that in reality none of the filler placed on the strip by the tank is wasted.

Pivoted to the frame 1 above the conveyer are a pair of holders 51 in which are arranged burnishers 52 adapted to engage the strip in its passage over the conveyer in order to smooth the surface and to remove all rough spots. These holders are provided with extensions 53 on which are adjustably mounted weights 54 for holding the burnishers in contact with the flooring strip. The burnishers are preferably formed of glass and are rounded as shown so that the surface of the strip as it passes under the same will be finished and left in such condition that the first coat of varnish can be applied thereto.

As the strip of flooring leaves the conveyer 22 it passes onto a delivery table 55, over which is arranged the movable support 56 having a tray 57 carried thereby, the under surface of which is covered with strips of felt 58, as clearly shown in Fig. 4. The bottom of the tray is provided with an opening 59, registering with an opening formed in the strips of felt through which the varnish is adapted to pass and be applied to the surface of the flooring strip.

The tray 57 is supplied with varnish through a pipe 60 extending from the varnish tank 61, said pipe extending into the reduced portion of the tray in such a manner that the varnish is prevented from overflowing by atmospheric pressure, whereby the varnish will be fed regularly to the tray so that it can be applied to the strip without any waste.

Mounted on the movable support 56 is a movable brush holder 62 in which are secured brushes 63 adapted to engage the strip so as to insure the spreading of the varnish on the strip as it passes through the machine. The movable support 56 is provided with an extension 64 on which is adjustably mounted a weight 65 for applying the proper pressure. The forward end of the movable support is provided with a guideway 66 to insure the passage of the strip under the varnish tray.

The operation of the apparatus shown for carrying out the method of coating and finishing strips of flooring is as follows: The strip is fed from the feed table under the brush 4 and is caught by the feed rollers 8 and 9 and carried forward over the supporting roller onto the endless conveyer 22, and is carried forward by this conveyer under the filler tank 25 where the filler is applied. As the strip passes from under the filler tank it is engaged by the wipers 49 which force into the pores the filler and remove all surplus. As the strip advances it is engaged by the burnishers 52 which smooth the surface so that as it passes under the varnishing tray 57 the varnish can be applied in such a manner as to obtain a finished surface. After the end of the strip passing through the machine leaves the feed rollers 8 and 9 it is carried forward by being pushed by the next strip, which prevents a strip from being carried out from under the filler tank and the varnish tank until the next strip has passed under the same.

I have found in practice that strips of flooring can be finished in my machine without any sand-papering operation as the filler is applied in such a manner that all the surplus is removed before it reaches the varnish tank, and I am able with this machine by using a thick or heavy filler to apply the first coat of varnish without waiting for the filler to harden.

From the foregoing description it will be seen that I have provided a machine for coating and finishing strips of flooring which is exceedingly simple and cheap in construction, and one in which a great saving in material is obtained, as I have found that by the use of a very heavy filler in connection with the pressing and wiping action that only the right amount of filler is applied to the surface.

While in the drawings I have shown a machine having certain details of construction, I do not wish to limit myself to these features, as the main object of my invention is to coat and finish a strip of lumber by pasisng it through a machine so as to eliminate all hand work. The method herein disclosed forms the subject matter of my application Serial No. 263,358, filed November 20, 1918.

What I claim is:

1. In an apparatus of the kind described, the combination with a movable support, of a tank mounted above said support, a pair of wipers arranged above said support, means for revolving said wipers in opposite directions for wiping the material arranged upon said support transversely thereof, and burnishers mounted to engage the material.

2. A machine for finishing strips of flooring comprising a frame having a movable support for supporting material to be operated upon, means for feeding strips of material upon said support, means for applying a filler on said strip when on said support, and means for wiping said filler transversely of said material.

3. An apparatus of the kind described, comprising a pair of feed rollers, an endless conveyer arranged in alinement with said rollers, a tank arranged above said conveyer, wipers arranged above said conveyer, means for holding said wipers in adjusted position, and a series of burnishers arranged over said conveyer.

4. In an apparatus of the kind described the combination with a movable support of a filler tank arranged to apply filler under pressure to the material on said support, revolving wipers arranged to wipe the filler applied transversely to the grain of the material for forcing the filler into the pores of the material and for removing any surplus therefrom and burnishers for smoothing the filler on the material.

5. In an apparatus of the kind described, the combination with an endless conveyer forming a support for the material, means for applying a filler to the material under pressure, means for wiping the filler from the material, means for burnishing the material, and means for coating the material.

6. A machine for coating and finishing lumber having a revolving brush to clean the surface thereof and the pores of the material, means for applying filler to the material for filling the pores of the material, means for burnishing the filler applied and means for applying a coat of varnish thereto.

7. In an apparatus of the kind described, the combination with a movable support for supporting the material to be operated upon, of a yieldingly movable tank having means for applying a filler to the material on said support, a series of wipers arranged over said support, a series of burnishers arranged over said support, and a varnish tank arranged to supply varnish to a tray mounted in alinement with said support.

8. A machine for coating and finishing lumber having a revolving brush to clean the pores thereof, means for filling the pores with a filler, means for burnishing the filler, and means for applying a coat of varnish thereto.

9. A machine for coating and finishing strips of flooring comprising a frame having an endless movable support, means for feeding strips of material onto said support, means for applying a filler to said strips when on said support, and means for applying a coat of varnish to said strips after they leave said support.

10. A machine of the character described comprising a frame having a movable support, feed rollers arranged at one end of said support, a brush arranged in advance of said feed roller, a tank having means for applying filler to a strip when on said support, revolving wipers mounted out of alinement for wiping the filler from said strip, burnishers arranged to engage said strips, and means for coating said strip with varnish after it leaves said support.

11. A machine of the kind described comprising a frame having a movable support, feed rollers arranged in advance of said support for conveying a strip of lumber on said support, means for cleaning said strip, means for applying filler to said strip under pressure, means for wiping and rubbing said strip after the filler has been applied thereto, means for burnishing said strip, and means for coating said strip.

12. An apparatus of the kind described comprising a frame, a movably mounted support arranged upon said frame, a pair of feed rollers arranged in advance of said support for feeding material to said support, a movably mounted filler tank arranged above said support for applying the filler to the material upon said support, a pair of revolving wipers mounted above said support, and adapted to engage the material thereon, and means for revolving said wipers in opposite directions.

13. A machine of the character described comprising a movable support for the material, means for feeding material to said support, and a filler tank pivotally mounted upon said frame for applying filler to the material upon said support said filler tank having means for holding the same in contact with the material under pressure.

14. In a machine of the kind described comprising a movable support, means for feeding material to said support, the filler tank arranged over said support in the path of travel of said material, said tank being carried by a movable block, means for holding said block in contact with the material under pressure and oppositely rotating wipers arranged above said support for wiping the material transversely thereof.

15. A machine of the kind described comprising a frame, a movable support mounted in said frame, a block pivotally mounted in said frame above said support having an opening, a strip of rubber secured to the under surface of said block having a beveled face, a filler tank mounted on said block, a weight for holding said block into contact with the material upon said support, a pair of feed rollers for feeding material onto said support, and a revolving wiper arranged to wipe the filler into the pores of the material upon said support.

16. A machine of the kind described comprising a frame having a support for the material to be operated upon, means for feeding the material to said support, means for applying a heavy filler to the material under pressure, means for wiping the filler into the pores of the material and burnishers for engaging the material upon said support.

17. A machine of the kind described comprising a frame, a movable support mounted in said frame, means for feeding the material to said support and causing said support to move with the material, a filler tank for applying the filler to the material under pressure, a pair of revolving wipers arranged to wipe the filler into the pores of the material upon said support, and burnishers arranged to engage the material on said support.

18. A machine of the kind described comprising a frame having a movable support, means for feeding the material to said support, a pair of pivoted frames mounted above said support, means for adjusting said frames, revolving wipers carried by said frames for engaging the material upon said support, and means for burnishing the material upon said support after it has passed under said wipers.

19. A machine of the kind described comprising a frame having an endless support mounted therein, a pair of feed rollers arranged to feed the material to said support, means for cleaning the material before it reaches said support, a filler tank for applying filler to the material upon said support, revolving wipers arranged to engage the material upon said support, pivoted burnishers arranged to engage the material and means for coating the strip of material after it leaves said support.

20. A machine of the kind described comprising a movable support for supporting the material to be operated upon, means for feeding the strip of material to said support, a filler tank arranged above said support for applying the coating of filler onto the material under pressure and wipers arranged above said support for wiping the filler into the pores of the wood transversely of the grain thereof.

ELMER C. DITTMAR.

Witnesses:
ELIZABETH V. LOWE,
OLIVER J. DECKER.